Nov. 19, 1963     H. PETERS     3,111,451

METHOD OF BONDING POLYMERS AND ARTICLES PRODUCED

Filed Dec. 31, 1956

INVENTOR
H. PETERS
BY
ATTORNEY

United States Patent Office 3,111,451
Patented Nov. 19, 1963

3,111,451
METHOD OF BONDING POLYMERS AND ARTICLES PRODUCED
Henry Peters, Summit, N.J., assignor to Bell Telephone Laboratories, Incorporated, New York, N.Y., a corporation of New York
Filed Dec. 31, 1956, Ser. No. 631,754
10 Claims. (Cl. 161—216)

This invention relates to methods for bonding saturated aliphatic hydrocarbon polymers to various materials unlike said polymers, and relates also to articles containing bonds produced by said methods.

In particular, the invention pertains to methods for bonding polyethylene and analogous organic polymers to rubber or metal, and pertains also to articles produced by said methods.

Polyethylene, the polymer produced by the polymerization of ethylene, has found wide favor in many industries. It is an acid- and alkali-resistant thermoplastic material with good dielectric properties. Its chemical inertness makes it an ideal substance from which to fabricate articles which must withstand attack by corrosive substances. The insulating properties of polyethylene make it desirable as a coating for wires, for example, and as a material for components in many other devices used in the electrical arts One difficulty recurring in the adaption of polyethylene to varied needs in the arts, however, is the problem of suitably joining polyethylene to other materials, particularly to rubber and to metals.

Though polyethylene may be extruded over metals, for example as an insulating sheath for wires, the plastic is not joined to the metal by other than mechanical forces. If the coated wire is subjected to improper stresses, the plastic sheath may slip along the wire, peeling free and exposing the metal.

In joining polyethylene to rubber, one of the most effective methods now known in the art comprises the fabrication of a graded seal. This seal is described in the patent to H. Peters, No. 2,635,975, granted April 21, 1953. Other prior art methods rely on pressure sensitive adhesives for joining rubber and polyethylene, and produce weak bonds only.

By the methods of the present invention, polyethylene and polymers like polyethylene can be firmly bonded to metal, and can be firmly joined to rubber more simply than by the graded seal technique. The method makes use of a layer of partially hydrogenated polybutadiene interposed between the polyethylene or similar polymer and the rubber or metal article to which the polyethylene is to be joined.

Figure 1:
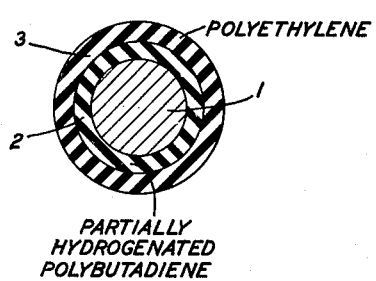
Figure 2:
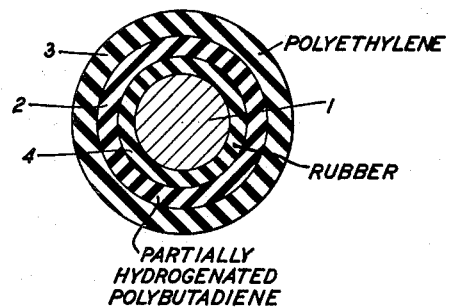
Figure 3:
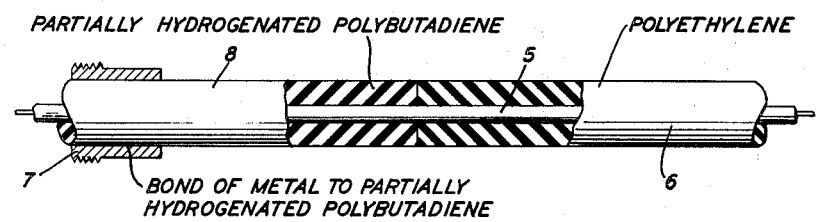
Figure 4:
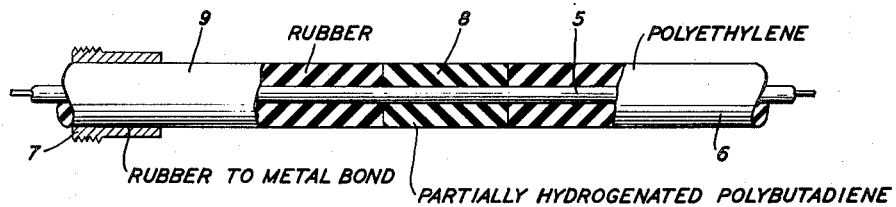

In the accompanying drawings, FIG. 1 is a side elevation in section of a metal filament bonded to a polyethylene covering by an intermediate layer of partially hydrogenated polybutadiene;

FIG. 2 is a side elevation in section of a metal filament bonded to a rubber coating, which rubber is in turn bonded to a polyethylene coating by an intermediate layer of partially hydrogenated polybutadiene;

FIG. 3 is a front elevation, partly in section, of a portion of a submarine cable with outer coverings removed, in which polyethylene is bonded to metal by means of a layer of partially hydrogenated polybutadiene; and FIG. 4 is a front elevation, partly in section, of a portion of a submarine cable, similar to that in FIG. 3, in which polyethylene is bonded to rubber by means of an intermediate layer of partially hydrogenated polybutadiene, and said rubber is in turn bonded to a metal body.

In FIG. 1, metal body 1, which may be a wire for example, is coated with layer 2 of partially-hydrogenated polybutadiene, vulcanized to metal body 1. Over layer 2 is second layer 3 of a saturated aliphatic hydrocarbon polymer such as polyethylene, bonded to layer 2 by heat sealing.

In FIG. 2 is shown a metal body 1 coated with a layer of rubber 4, vulcanized to said metal body 1. Layer 2 of partially hydrogenated polybutadiene is vulcanized to said rubber layer 4. Outer coating 3, of a saturated aliphatic hydrocarbon polymer such as polyethylene, is bonded to layer 2 by heat sealing.

In FIG. 3 is shown a portion of a submarine cable with outer coverings removed. A central metal core assembly 5, conveniently of brass, is the primary conductor, covered in the main body of the cable with a cylindrical insulating layer of polyethylene 6. It is essential that a moisture-proof seal be made between polyethylene layer 6 and cylindrical metal sleeve member 7, conveniently formed of brass, which is a portion of a metal housing (not shown) for a vacuum tube repeater unit (not shown). To provide such a bond, polyethylene insulation 6 has been bonded by heat sealing to a cylindrical insulating layer 8 of partially hydrogenated polybutadiene which similarly covers and insulates a portion of central core assembly 5. Partially hydrogenated polybutadiene layer 8 has also been bonded to metal sleeve member 7 by a vulcanization process forming firm links between the plastic and the brass surface of member 7.

In FIG. 4, a portion of a submarine cable, similar to that in FIG. 3 is shown. However, to make a moisture-proof seal between that portion of the cable insulated with polyethylene 6, and metal housing member 7, conveniently of brass, metal member 7 has been bonded to rubber insulating covering 9. This bonding is done by methods known in the art by which rubber is vulcanized in contact with metal member 7, forming an adherent moisture-proof seal. Rubber covering 9 has been bonded to polyethylene insulation 6 through an intermediate insulating cylindrical layer of partially-hydrogenated polybutadiene 8. Both segment 9 of rubber and segment 6 of polyethylene are firmly bonded to intermediate segment 8 of partially hydrogenated polybutadiene by vulcanization and heat sealing processes.

The bonding intermediary, partially hydrogenated polybutadiene, which is used to join polyethylene-like polymers to rubber or metal, is itself a polymer resembling polyethylene. Polybutadiene has the approximate structure

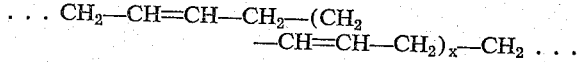

where $x$ is a large number. In general about one of every 20 monomer units in the polymer will polymerize to form a side chain, depending on the method of polymerization. The polymer, unless deliberately more extensively cross-linked, is a rubbery material with little resemblance to polyethylene. If the polymer, after its formation by polymerization of butadiene

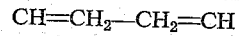

is partially hydrogenated, it becomes firmer, more waxy, stiff, loses retractibility or recovery, and approximates polyethylene in properties and appearance as more of the unsaturations originally present in the polymer are saturated.

The extent of saturation can be measured by reference to the number of available double bonds in unhydrogenated polybutadiene. The extent of hydrogenation may then conveniently be expressed in term of the fraction of this number of unsaturations which remain unsaturated after partial hydrogenation. The extent of unsaturation may be determined by a comparison of the hydrogen volumes absorbed in partial and in complete hydrogenation, for example, or by titration of the unsaturations with iodine chloride.

For purposes of bonding to polyethylene-like polymers and rubber or metal, partially hydrogenated polybutadiene having as few as 3 percent of the unsaturations of the unhydrogenated polymer left unsaturated has proved to give excellent bonds. At the other end of the scale, partially hydrogenated polybutadiene containing as many as 85 percent of the original unsaturations gives a useful bond to both polyethylene and metal or rubber.

Stronger bonds can be made to the partially-hydrogenated material if the amount of unsaturation lies between 4 percent and 55 percent of the unsaturations available in the unhydrogenated polymer. When the limits of unsaturation are kept between about 8 percent and about 30 percent of those in the fully unsaturated polymer, particularly strong bonding is observed, both to polyethylene or polyethylene-like polymers, and to rubber and metal.

The bond of the partially hydrogenated polybutadiene to polyethylene-like polymers is believed to be primarily a mechanical bond between thermoplastic materials. Of the polymers to which partially hydrogenated polybutadiene may be joined, the most important commercially at present is polyethylene. However, other saturated aliphatic hydrocarbon polymers which resemble polyethylene may be bonded to partially hydrogenated polybutadiene. For example, other polymers of this class are:

Polypropylene

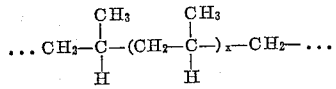

Poly n-butylene

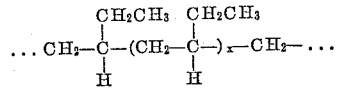

And polyisobutylene,

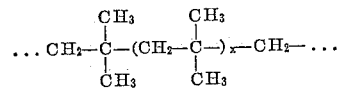

As mentioned, partially hydrogenated polybutadiene can be joined to saturated aliphatic hydrocarbon polymers, as exemplified above, by heat sealing. Adhesion of the thermoplastic materials occurs on application of heat and pressure. Extremely good bonding is obtained when the partially hydrogenated polybutadiene is unvulcanized or only partially vulcanized at the time of heat sealing. Polyethylene may also be joined to fully vulcanized partially hydrogenated polybutadiene to give bonds better than those now produced in the art using pressure-sensitive adhesives.

For heat sealing, as is known in the art, the materials being joined should show some flow, which requires that the softening point of the materials be exceeded. For polyethylene, for example, bonding to partially-hydrogenated polybutadiene by heat sealing can be accomplished at temperatures between about 100° C. and 400° C. A temperature of 150° C. is convenient. With pressure, the materials are caused to flow together and bond. A pressure sufficient to give intimate contact between the materials being joined is used. The value is usually in excess of 25 pounds per square inch, though pressures of 400 pounds per square inch have often been used because most convenient on available commercial presses.

If desired, mechanical mixtures of two or more saturated hydrocarbon polymers, such as mixtures of polyethylene and polypropylene, may be sealed to partially hydrogenated polybutadiene by the same expedients. Copolymers of the monomeric ingredients of two or more different saturated hydrocarbon polymers may be produced and joined similarly to the partially hydrogenated polybutadiene. For example, ethylene and propylene may be copolymerized to give a product joinable to the partially hydrogenated bonding agent by heat sealing. Further illustration and description of the invention in this specification will be with reference to the preferred material, polyethylene, but it is to be understood that other saturated aliphatic hydrocarbon polymers may be used.

A wide variety of vulcanizable rubbers and vulcanizable rubber compositions or mixtures thereof can be bonded to partially hydrogenated polybutadiene by vulcanization. Both hard and soft rubber materials can be bonded. Examples of various types of vulcanizable soft rubber compositions, known to the art, which may be bonded to partially-hydrogenated polybutadiene, are given below. The compositions generally comprise an unvulcanized rubber, a vulcanizing agent, and various optional accelerators, activators, fillers, plasticizers and antioxidants which have little or no effect on the bonding process but are included to alter or modify the characteristics of the rubber.

TABLE I

| | Parts by weight |
|---|---|
| Natural rubber | 100.00 |
| Vulcanizing agent: sulfur | 3.00 |
| Accelerator: 2-mercaptobenzothiazole | 0.50 |
| Activator: zinc oxide | 50.00 |
| Antioxidant: polymerized trimethyldihydroquinoline | 1.00 |
| Activator: stearic acid | 0.50 |
| Softener: petrolatum | 5.00 |

TABLE II

| | |
|---|---|
| GR–S rubber (butadiene-styrene copolymer) | 100.00 |
| Vulcanizing agent: sulfur | 2.00 |
| Accelerator: tetramethylthiuram monosulfide | 0.40 |
| Accelerator: benzothiazyl disulfide | 0.40 |
| Activator: zinc oxide | 5.00 |
| Reinforcing agent: carbon black | 45.00 |
| Softener: process oil (paraffin oil) | 15.00 |

TABLE III

| | |
|---|---|
| Neoprene (chloroprene rubber) | 100.00 |
| Accelerator: di-ortho-tolylguanidine salt of dicatechol borate | 0.40 |
| Activator: magnesium oxide | 4.00 |
| Activator: zinc oxide | 5.00 |
| Antioxidant: phenyl-beta-naphthylamine | 1.50 |
| Activator: stearic acid | 0.50 |
| Reinforcing agent: carbon black | 60.00 |
| Softener: process oil | 10.00 |

TABLE IV

| | |
|---|---|
| Hycar rubber (butadiene-acrylonitrile copolymer) | 100.00 |
| Vulcanizing agent: sulfur | 2.00 |
| Accelerator: benzothiazyl disulfide | 1.50 |
| Activator: zinc oxide | 5.00 |
| Activator: stearic acid | 1.50 |
| Reinforcing agent: carbon black | 25.00 |
| Plasticizer: coumarone-indene copolymer | 15.00 |
| Filler: amorphous diatomaceous silica | 15.00 |

TABLE V

| | |
|---|---|
| Butyl rubber (isobutylene-isoprene copolymer) | 100.00 |
| Vulcanizing agent: sulfur | 1.50 |
| Accelerator: tetramethylthiuram disulfide | 1.00 |
| Activator: zinc oxide | 5.00 |
| Softener: asphalt | 6.00 |
| Reinforcing agent: carbon black | 50.00 |
| Softener: process oil | 5.00 |

TABLE VI

| | |
|---|---|
| Polybutadiene | 100.00 |
| Vulcanizing agent: sulfur | 3.00 |
| Accelerator: tetramethylthiuram monosulfide | 0.40 |
| Accelerator: benzothiazyl disulfide | 0.40 |
| Activator: zinc oxide | 5.00 |
| Reinforcing agent: carbon black | 45.00 |
| Softener: process oil (paraffin oil softening and plasticizing agent) | 15.00 |

The compositions tabulated above are exemplary only. Other compositions of natural or synthetic rubbers, including neoprene, GR-S, Hycar, butyl, and polybutadiene rubbers, or mixtures thereof, standard in the rubber art, can be bonded to partially hydrogenated polybutadiene. The strongest bonds between rubber and the mentioned bonding agent are formed when natural rubber, GR-S rubber, or unsaturated polybutadiene rubber are used and these materials are preferred. Molecules of these materials are substantially free of polar groups, which fact is believed explanatory of the particularly good bonds formable to these rubbers.

Partially hydrogenated polybutadiene can also be bonded to vulcanizable hard rubbers, of which the following composition, known in the art, is typical.

TABLE VII

| | Parts by weight |
|---|---|
| Natural rubber | 100.00 |
| Vulcanizing agent: sulfur | 32.00 |
| Filler: clay | 85.00 |
| Filler: hard rubber dust | 20.00 |
| Accelerator: butyraldehyde-aniline condensation product | 1.00 |

The bond between partially hydrogenated polybutadiene and compositions of soft or hard rubbers is one believed formed primarily by vulcanization. It is thought that cross-linking between unvulcanized, vulcanizable rubber and partially hydrogenated polybutadiene occurs at the unsaturations present in both molecules. Since even a minimal number of unsaturations in partially hydrogenated polybutadiene suffices for a strong bond to vulcanizable rubbers, however, perhaps other bonding mechanisms are additionally operative.

To bond a vulcanizable rubber, or a vulcanizable rubber composition, or mixtures thereof to partially hydrogenated polybutadiene, the two materials are brought into contact, in the presence of a vulcanizing agent, and cured at an elevated temperature under pressure. The vulcanizing agent, which is usually sulfur, though peroxides, selenium, and tellurium may be used as vulcanizing agents, is usually previously incorporated into the unvulcanized rubber composition in an amount between 0.1 percent and 3.0 percent of the weight of rubber in the composition, as is common in the rubber arts. Some of the vulcanizing agent, or an additional vulcanizing agent, may also be present in the partially hydrogenated polybutadiene. Vulcanization of the rubber and bonding of the rubber to the partially hydrogenated polybutadiene are done simultaneously.

Curing can be accomplished in times and at temperatures already known to the art for rubber cures. That is, a curing time between 10 minutes and 1 hour is generally employed. In continuous vulcanization processes, such as are used in insulating wires with rubber compositions, a curing time as low as 10 seconds may be sufficient. Temperatures at curing are between about 120° C. and about 180° C. When curing times are cut to low values, as in continuous vulcanization, the temperature may be as high as 200° C. Generally, any method sufficient to cure a given vulcanizable rubber composition is sufficient to bind the same composition to partially-hydrogenated polybutadiene. For example, the soft rubber compositions specifically described above in Tables I and V can be vulcanized and joined to partially hydrogenated polybutadiene by a 20 minute cure at about 150° C. A pressure of about 400 pounds per square inch has been applied to the materials in contact during the bonding, though less pressure may be more convenient and is adequate as long as a good contact between the materials is made. Pressures as low as 25 pounds per square inch may be used in some cases.

For curing and bonding vulcanizable hard rubber compositions to partially hydrogenated polybutadiene, heat is applied in the same temperature range as for the soft rubbers. As in the standard hard rubber cure known in the art, longer times, within the preferred period specified, may be required for bonding when working with hard rubber than with soft rubber.

With the exception of vulcanizing agents, other additives commonly found in rubber, such as carbon black, which have been used heretofore in joining rubber compositions to non-rubber materials, are not essential in joining rubber compositions to partially-hydrogenated polybutadiene, and may be specifically excluded.

Partially hydrogenated polybutadiene can be bonded to metal, as well as to rubber. The bond of the polymer to metal is believed to be a chemical bond formed between metal atoms and atoms of the partially hydrogenated polybutadiene polymer, which is particularly susceptible to bonding chemically at its unsaturations. Brass surfaces are especially adaptable to bonding directly to partially-hydrogenated polybutadiene. The bonds obtained to brass are so superior to those formed to other metals that other metals are, preferably, first plated with brass before being joined to the partially hydrogenated polymer.

A vulcanizing agent, most commonly sulfur, though other agents are known in the rubber arts, is required in the process. An amount of vulcanizing agent which is between 0.1 percent and 3.0 percent of the weight of partially hydrogenated polybutadiene is generally used, as in the compounding of rubber compositions. The vulcanizing agent is easily milled into the partially hydrogenated polybutadiene, as is done in the compounding of rubber compositions. In addition to the vulcanizing agent essential to the bonding process, other materials known in the rubber compounding art may optionally be present. For example, accelerators, fillers, activators, antioxidants, plasticizers, and dispersing agents may be compounded with the partially hydrogenated polybutadiene and vulcanizing agents to give compositions having a variety of different properties, as in the rubber arts. As exemplary of more complex partially hydrogenated polybutadiene compositions containing ingredients other than the polymer and vulcanizing agent, the following two mixtures are given. Both compositions have shown particular effectiveness in bonding to brass surfaces.

TABLE VIII

| | Parts by weight |
|---|---|
| Partially hydrogenated polybutadiene (8 percent unsaturation) | 100.00 |
| Vulcanizing agent: sulfur | 3.00 |
| Accelerator: 2-mercaptobenzothiazole | 0.50 |
| Activator: zinc oxide | 50.00 |
| Antioxidant: polymerized trimethyldihydroquinoline | 1.00 |
| Activator: stearic acid | 0.50 |
| Softener: process oil | 5.00 |

TABLE IX

| | |
|---|---|
| Partially hydrogenated polybutadiene (18 percent unsaturation) | 100.00 |
| Vulcanizing agent: sulfur | 3.00 |
| Accelerator: 2-mercaptobenzothiazole | 0.50 |
| Activator: zinc oxide | 50.00 |
| Antioxidant: polymerized trimethyldihydroquinoline | 1.00 |
| Activator: stearic acid | 0.50 |
| Softener: process oil | 5.00 |

Bonding partially hydrogenated polybutadiene to metal is done by bonding processes similar to those used in bonding the plastic to rubber. Temperatures between about 120° C. and about 180° C. are usually used. Curing times may vary between 10 minutes and one hour, depending on the temperature. Shorter cure times are needed when higher temperatures in the preferred range given are used. Again, in continuous vulcanization processes, short curing times down to 10 seconds, and high temperatures, up to 200° C., may be used. Again, sufficient pressure is applied to the materials being joined to make good contact between the materials.

As in the vulcanization of rubber, the curing of partially-hydrogenated polybutadiene in the presence of a vulcanizing agent results in a reduction of the number of unsaturations present in the material. When the partially hydrogenated polybutadiene is milled with a vulcanizing agent before curing, cross-linking occurs throughout the material on curing. Sulfur atoms interconnect the molecules of partially hydrogenated polybutadiene to form a complex three-dimensional chain. Where the partially hydrogenated polybutadiene faces rubber or metal, its molecules bond, through sulfur, to the rubber or metal under the influence of the vulcanizing agent.

Where the vulcanizing agent is present, for example, in a rubber composition, but not in the partially hydrogenated polybutadiene itself, cross-linking at the interface of the materials again bonds the materials. In this case, however, extensive vulcanization of the partially-hydrogenated polybutadiene in portions away from the interface probably does not occur unless conditions are such that extensive diffusion of the vulcanizing agent into the partially hydrogenated polybutadiene occurs.

Contact of partially hydrogenated polybutadiene, or compositions of the polymer with other materials (e.g., see Tables VIII and IX), may be made to polyethylene, rubber, or metal in more than one way. The simplest technique is merely to oppose a polyethylene, rubber, or metal body with a sheet or other body of the partially hydrogenated polybutadiene or partially hydrogenated polybutadiene composition. Joining under heat and pressure is then carried out.

Alternatively, a solution of the partially hydrogenated polybutadiene or partially hydrogenated polybutadiene composition in a volatile solvent may be prepared. Materials such as benzene, chlorobenzene, toluene, xylene, and other volatile aromatic hydrocarbons or chlorinated aromatic hydrocarbons are particularly effective as solvents. Methylene chloride, trichloromethane and carbon tetrachloride are also superior solvents. Whether the partially hydrogenated polybutadiene is applied as a milled sheet or as a solute in a volatile solvent, in either technique a minimum thickness of about 3 mils of partially hydrogenated polybutadiene between materials being joined thereby is preferred. Thicknesses of 5 mils or greater of partially hydrogenated polybutadiene give still better bonds. Where the building up of thick layers is not objectionable, intermediate layers of partially hydrogenated polybutadiene 10 mils thick or thicker may be used. The solutions are applied in a single or a repeated application to polyethylene, rubber, or metal by spraying, dipping, or painting, for example. On evaporation of the solvent, the partially hydrogenated polybutadiene remains as a coating or film on the rubber or metal. Bonding under heat and pressure can then follow. Five percent to ten percent solutions of partially hydrogenated polybutadiene in toluene or carbon tetrachloride and solutions of similar strength of partially hydrogenated polybutadiene-vulcanizing agent mixtures in toluene or carbon tetrachloride have been used with special success in bonding the partially hydrogenated polybutadiene to rubber and metal.

A variation in the bonding of polyethylene to metal can be made by bonding a metal to rubber, which latter in turn is bonded to partially hydrogenated polybutadiene by methods described above. Polyethylene or polyethylene-like materials are further joinable to the partially hydrogenated polybutadiene to give a polyethylene-partially hydrogenated polybutadiene-rubber-metal structure.

Since various agents are known in the art for joining rubber compositions to a variety of metals, strong bonds of partially hydrogenated polybutadiene, and then also polyethylene, to metals other than brass or brass-plated metals can be produced in this manner. The patent to Winkelmann and Moffett, No. 2,147,620, granted February 14, 1939, described such agents for bonding rubber to iron and steel, copper, brass, aluminum and other materials. Using bonding agents of the kind mentioned in the patent, rubber compositions such as those earlier described can be bonded to a metal substrate. The techniques taught herein are used to add additional laminae of partially hydrogenated polybutadiene and polyethylene.

Exemplary of the bonding agents taught in the aforementioned patent is the following.

TABLE X

| | Parts by weight |
|---|---|
| Rubber hydrochloride (30 percent chlorine content) | 100.00 |
| Vulcanizing agent: sulfur | 50.00 |
| Accelerator: butyraldehyde-aniline | 3.00 |
| Plasticizer: dibutyl phthalate | 75.00 |
| Heat stabilizer: | |
| Magnesium oxide | 10.00 |
| Lead oxide | 10.00 |

When using such agents, a preferred technique is to coat the metal with the bonding agent, apply thereover a vulcanizable rubber composition containing a vulcanizing agent, face the vulcanizable rubber with partially hydrogenated polybutadiene, add a final lamina of polyethylene, and then to bond the entire structure under heat and pressure. Alternatively, the final layer of polyethylene may be heat-sealed to the structure after simultaneous vulcanization and bonding of the underlying layers has been carried out.

The following are examples of the practice of the invention described in the specification. They are meant to be illustrative only and not limiting on the scope and spirit of the invention.

*Example 1*

A disc of polyethylene, a ⅛ inch thick disc of partially hydrogenated butadiene containing 18 percent unsaturation, and a disc of a vulcanizable natural rubber composition corresponding to that given in Table I were stacked, in the order given above, and cured for 20 minutes at about 150° C. under a pressure of 400 pounds per square inch. The resulting laminated structure showed firm bonding of both the polyethylene and the rubber to the median layer of partially hydrogenated polybutadiene.

*Example 2*

A solution of toluene containing 10 percent by weight of partially hydrogenated polybutadiene having 18 percent of the original unsaturations therein was painted on a sheet of the vulcanizable GR-S rubber composition described in Table II above to give a coating between 5 mils and 10 mils thick. After evaporation of the solvent, a sheet of polyethylene was placed on the coating of partially hydrogenated polybutadiene. The laminate was cured for 20 minutes under a pressure of 400 pounds per square inch at a temperature of about 150° C. After this time the materials were bonded together strongly.

*Example 3*

A 10 percent solution of 18 percent unsaturated partially hydrogenated polybutadiene was applied to the surface of a sheet of the vulcanizable natural rubber composition described in Table I to give a coating between 5 mils and 10 mils thick. The coated rubber was then vulcanized for 20 minutes at about 150° C. and under a pressure of 400 pounds per square inch. The bonded rubber and partially hydrogenated polybutadiene were then bonded to polyethylene by heat sealing the polyethylene to the partially hydrogenated polybutadiene face at 150° C. for 20 minutes under pressure.

*Example 4*

A disc, ⅛ inch thick, of the partially hydrogenated polybutadiene composition of Table VIII was interposed between a polyethylene disc and a brass surface. The laminate was heated at about 150° C. for 30 minutes under a pressure of 400 pounds per square inch. Firm bonds between the polyethylene and partially hydrogenated polybutadiene, and between the latter and the brass surface were produced.

*Example 5*

A sufficient quantity of the composition set forth in Table IX was dissolved in toluene to give a 10 percent solution. The resulting cement was applied to a brass surface till, after evaporation of the solvent, a layer of the composition about 5 mils to 10 mils thick remained. A polyethylene disc was then placed against the partially hydrogenated polybutadiene surface and the entire laminate heated for 30 minutes at about 150° C. under a pressure of 400 pounds per square inch. Firm bonds between the laminae resulted.

*Example 6*

The partially hydrogenated polybutadiene composition of Table IX was milled as a sheet about ⅛ inch thick. The sheet was bonded to a brass strip by heating the materials in contact under pressure for 20 minutes at about 145° C. The now-vulcanized partially hydrogenated polybutadiene was then bonded to a polyethylene strip by a heat sealing step carried out under pressure at about 145° C. for 20 minutes.

Polyethylene, as generally marketed, and as used in commerce, almost invariably contains any of several additives included for various purposes known to those skilled in the art. For example, such polymer may include minor amounts of antioxidants intended to protect the polymer from thermal oxidation, ultraviolet absorbers such as carbon black intended to protect the material from ultraviolet oxidation, additives designed to change the polymer's mechanical properties including, for example, polyisobutylene, usually referred to as plasticizers (commonly included in amounts of the order of 5 percent), and coloring materials including pigments and dyestuffs. It is to be understood that where the term "polyethylene" is used, both in this description and in the appended claims, reference is made to this polymer containing minor amounts of any of such additives.

What is claimed is:

1. The method of bonding a first surface of polyethylene to a second surface consisting substantially of brass which comprises bringing the said first and second surfaces in contact with an intermediate layer of partially hydrogenated polybutadiene containing between about 3 percent and about 85 percent of the unsaturations present in the unhydrogenated material, such that there is sulfur in contact with the said intermediate layer at the area contacting the said second surface, and heating the said intermediate layer whereby the said layer is heat sealed to the said first surface and vulcanized to the said second surface.

2. The method of claim 1 in which the said partially hydrogenated polybutadiene contains between about 4 percent and about 55 percent of the unsaturations present in the unhydrogenated material.

3. The method of bonding a first surface of polyethylene to a second surface consisting substantially of a sulfur-vulcanizable rubber which comprises bringing the said first and second surfaces in contact with an intermediate layer of partially hydrogenated polybutadiene containing between about 3 percent and about 85 percent of the unsaturations present in the unhydrogenated material, such that there is sulfur in contact with the said intermediate layer at the area contacting the said second surface, and heating the said intermediate layer whereby the said layer is heat sealed to the said first surface and vulcanized to the said second surface.

4. The method of claim 3 in which the said partially hydrogenated polybutadiene contains between about 4 percent and about 55 percent of the unsaturations present in the unhydrogenated material.

5. The method of claim 3 in which the said sulfur-vulcanizable rubber comprises at least one member selected from the group consisting of natural rubber, butadiene-styrene rubber, and polybutadiene rubber.

6. The method of claim 3 in which the said intermediate layer of partially hydrogenated polybutadiene contains sulfur.

7. The method of claim 3 in which the said sulfur-vulcanizable rubber contains sulfur.

8. A composite body comprising a surface of polyethylene bonded to a layer produced from partially hydrogenated polybutadiene containing between about 3 percent and about 85 percent of the unsaturations present in the unhydrogenated material, the said layer being bonded by sulfur vulcanization to a surface consisting essentially of brass.

9. A composite body comprising a surface of polyethylene bonded to a layer produced from partially hydrogenated polybutadiene containing between about 3 percent and about 85 percent of the unsaturations present in the unhydrogenated material, the said layer being bonded by sulfur vulcanization to a surface consisting essentially of sulfur-vulcanizable rubber.

10. A method of adhering a layer of polyethylene to a rubber selected from the group consisting of homopolymers of aliphatic conjugated diolefins having 4 to 5 carbons per molecule, copolymers of said diolefins with copolymerizable monomers containing the $CH_2=C<$ group, and polychloroprene, said rubber containing a vulcanizing agent, comprising interposing therebetween a solid layer of hydrogenated polybutadiene, the unsaturation of said polybutadiene being 5 to 50 percent of the unsaturation of the polybutadiene prior to hydrogenation, and applying heat and pressure to adhere the assembled layers.

References Cited in the file of this patent

UNITED STATES PATENTS

| | | |
|---|---|---|
| 2,046,160 | Graves | June 30, 1936 |
| 2,046,257 | Flint | June 30, 1936 |
| 2,543,229 | Chapman | Feb. 27, 1951 |
| 2,635,975 | Peters | Apr. 21, 1953 |
| 2,692,841 | Frank et al. | Oct. 26, 1954 |
| 2,786,047 | Jones et al. | Mar. 19, 1957 |
| 2,813,809 | Jones et al. | Nov. 19, 1957 |
| 2,864,809 | Jones et al. | Dec. 16, 1958 |

FOREIGN PATENTS

| | | |
|---|---|---|
| 618,345 | Great Britain | Feb. 21, 1949 |